US010091608B2

(12) United States Patent
Lipman et al.

(10) Patent No.: US 10,091,608 B2
(45) Date of Patent: Oct. 2, 2018

(54) METHOD, APPARATUS AND SYSTEM FOR EXCHANGING MAP INFORMATION

(75) Inventors: Justin Lipman, Shanghai (CN); Robert A. Colby, Granite Bay, CA (US)

(73) Assignee: INTEL CORPORATION, Santa Clara, CA (US)

( * ) Notice: Subject to any disclaimer, the term of this patent is extended or adjusted under 35 U.S.C. 154(b) by 292 days.

(21) Appl. No.: 13/997,515

(22) PCT Filed: Jun. 25, 2012

(86) PCT No.: PCT/CN2012/077419
§ 371 (c)(1),
(2), (4) Date: Aug. 22, 2014

(87) PCT Pub. No.: WO2014/000140
PCT Pub. Date: Jan. 3, 2014

(65) Prior Publication Data
US 2014/0364139 A1    Dec. 11, 2014

(51) Int. Cl.
*H04W 4/02*    (2018.01)
*H04L 29/08*    (2006.01)
*H04W 4/06*    (2009.01)

(52) U.S. Cl.
CPC .............. *H04W 4/02* (2013.01); *H04L 67/16* (2013.01); *H04L 67/26* (2013.01); *H04W 4/023* (2013.01); *H04W 4/06* (2013.01)

(58) Field of Classification Search
CPC ......... H04W 4/02; H04W 64/00; H04W 4/04; H04W 8/183; H04W 4/043; H04W 48/14;
(Continued)

(56) References Cited

U.S. PATENT DOCUMENTS

2005/0288854 A1    12/2005 Kitajima et al.
2008/0003988 A1*    1/2008 Richardson ....... H04L 29/06027
455/414.3
(Continued)

FOREIGN PATENT DOCUMENTS

CN    1240074    12/1999
CN    1712896    12/2005
(Continued)

OTHER PUBLICATIONS

International Preliminary Report for PCT Application No. PCT/CN2012/077419 dated Dec. 31, 2014, 5 pages.
(Continued)

*Primary Examiner* — Christopher M Brandt
*Assistant Examiner* — Jing Gao
(74) *Attorney, Agent, or Firm* — Womble Bond Dickinson (US) LLP

(57) ABSTRACT

Methods and mechanisms for exchanging map information in a wireless communication. In an embodiment, map information to represent at least a portion of a map is advertised by a first communication device communication independent of any request for the map information being received in a data session or a voice session. In another embodiment, a second communication device receives the wireless communication and generates a representation of the map based on the advertised map information.

20 Claims, 5 Drawing Sheets

(58) Field of Classification Search
CPC ... H04W 4/021; H04W 4/025; H04W 76/007;
H04W 84/12; H04W 88/06; H04W 24/02;
H04W 48/18; H04W 4/028; H04W
56/006; H04W 8/065; H04W 4/023;
H04W 4/06; G06Q 30/02; H04L 67/16;
H04L 67/26
USPC ...................................................... 455/456.1
See application file for complete search history.

(56) References Cited

U.S. PATENT DOCUMENTS

| | | | | |
|---|---|---|---|---|
| 2008/0046172 | A1* | 2/2008 | Ames | G01C 21/28 |
| | | | | 701/532 |
| 2009/0088183 | A1* | 4/2009 | Piersol | G01C 21/206 |
| | | | | 455/456.1 |
| 2010/0105409 | A1 | 4/2010 | Agarwal et al. | |
| 2011/0144899 | A1 | 6/2011 | Soelberg | |
| 2012/0115512 | A1* | 5/2012 | Grainger | G01S 5/0257 |
| | | | | 455/456.3 |
| 2012/0133840 | A1* | 5/2012 | Shirasuka | H04B 7/08 |
| | | | | 348/732 |
| 2013/0059614 | A1* | 3/2013 | Kannan | H04W 72/06 |
| | | | | 455/500 |

FOREIGN PATENT DOCUMENTS

| | | |
|---|---|---|
| CN | 1776769 | 5/2006 |
| CN | 101155005 | 4/2008 |
| WO | WO-9820631 | 5/1998 |

OTHER PUBLICATIONS

Office Action and Search (+English Translation) in Chinese Application No. 201280073446.6 dated May 4, 2016, 29 pages.
International Search Report and Written Opinion for China PCT Patent Application No. PCT/CN2012/077419 dated Mar. 21, 2013, 10 Pages.
Chandra, et al., "Beacon Stuffing: Wi-Fi Without Associations, http://research.microsoft.com/en-us/um/people/alecw/hotmobile-2007.pdf, Website last accessed Jun. 21, 2013", Whole Document.
Geier, Jim , "802.11 Beacons Revealed, Wi-Fi Planet, Oct. 31, 2002, http://www.wi-fiplanet.com/tutorials/article.php/1492071, Website last accessed Jun. 21, 2013,", (Oct. 31, 2002), Whole Document.
Orava, et al., "Adaptive Beaconing, doc:IEEE 802.11-02/601r0, TGk Jul. 2003, (PowerPoint document from online)", http://www.google.com/url?sa=t&rct=j&q=%E2%80%9Cadaptive%20beaconing%E2%80%9D%20orava&source=web&cd=1&ved=0CEEQFjAA&url=https%3A%2F%2Fmentor.ieee.org%2F802.11%2Fdcn%2F03%2F11-03-0601-00-000k-adaptive-beaconing.ppt&ei=eqPjT86jDYbk0QGDqoH4CQ&usg=AFQjCNHdwc1_, (Jul. 2003), Whole Document.
Extended European Search Report from EP12880152.9 dated Jan. 27, 2016, 7 pgs..
2nd Office Action for Chinese Patent Application No. 201280073446.6 dated Dec. 26, 2016, 6 pgs, no English translation.
Third Office Action from Chinese Patent Application No. 201280073446.6 dated May 24, 2017, 7 pgs.

* cited by examiner

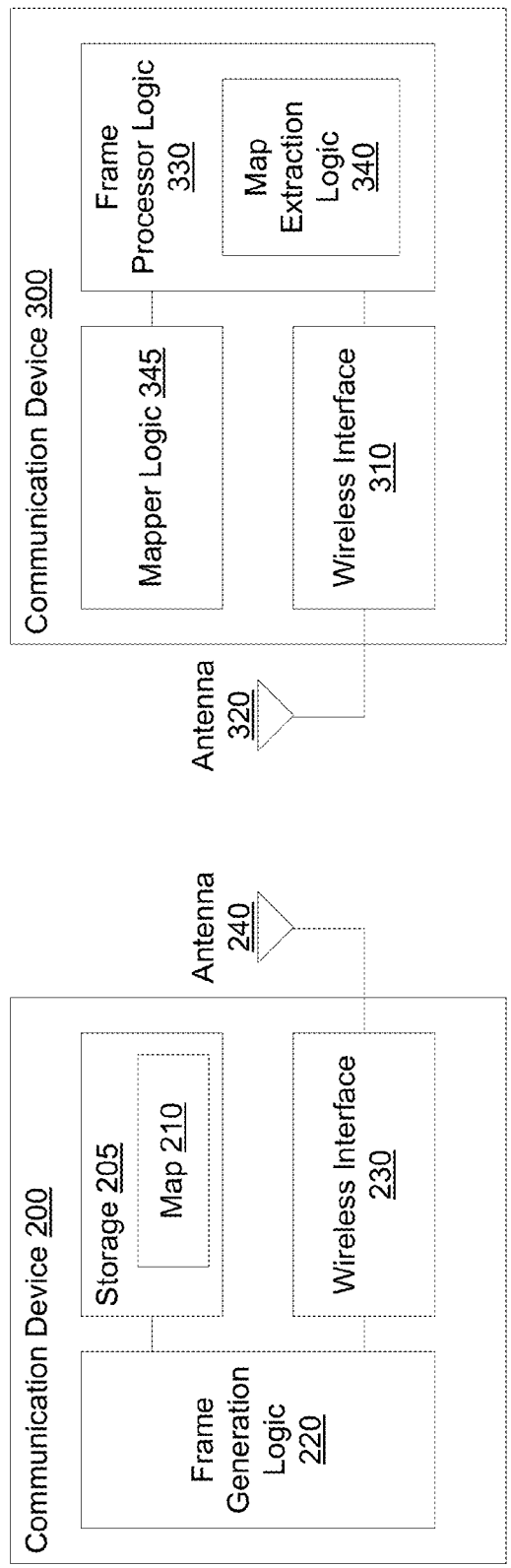

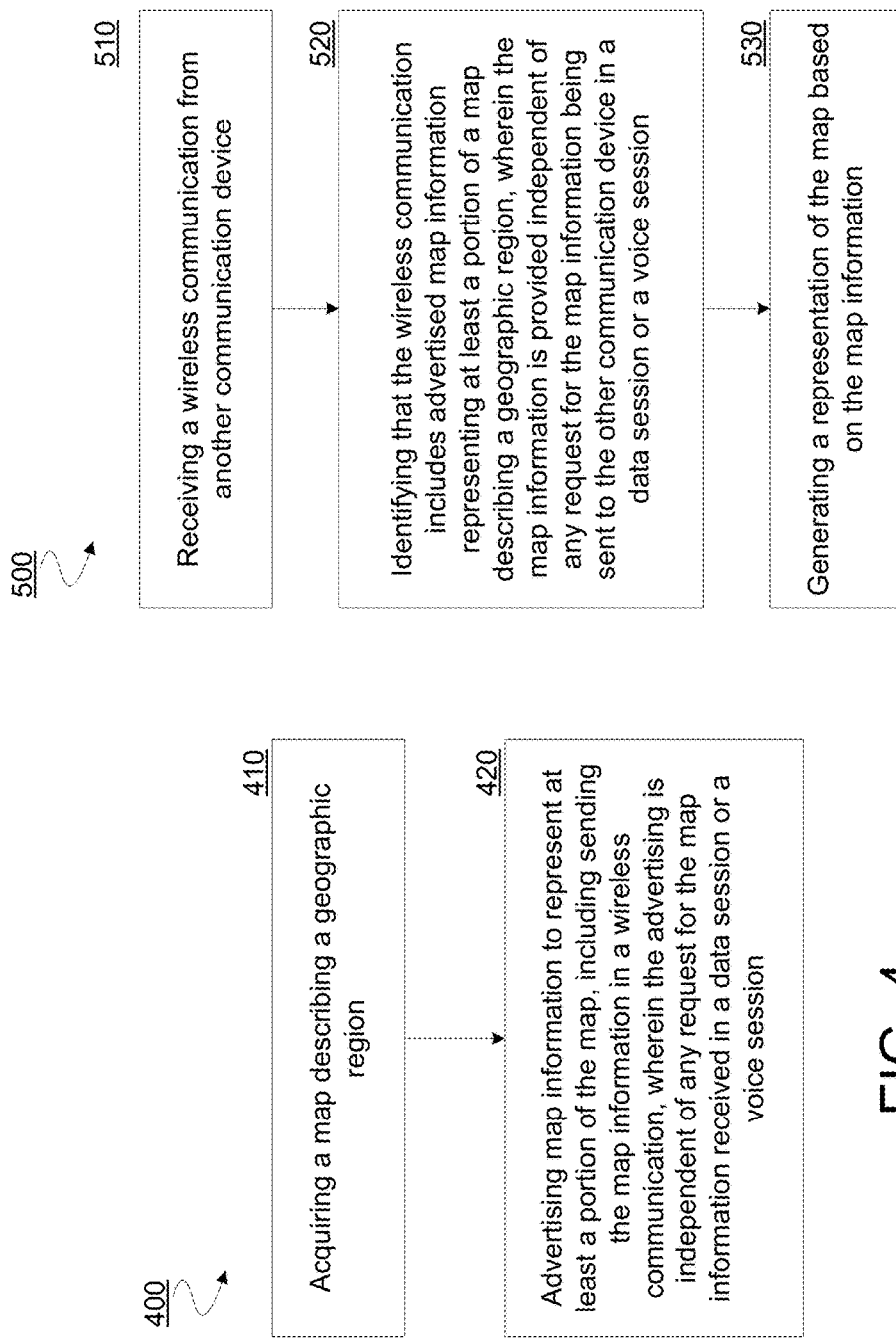

METHOD, APPARATUS AND SYSTEM FOR EXCHANGING MAP INFORMATION

CLAIM OF PRIORITY

This application is a U.S. National Phase application under 35 U.S.C. § 371 of International Application No. PCT/CN2012/077419, filed Jun. 25, 2012, entitled "METHOD, APPARATUS AND SYSTEM FOR EXCHANGING MAP INFORMATION," the entire contents of which are incorporated herein by reference.

BACKGROUND

1. Technical Field

Embodiments relate generally to techniques for communicating map information wirelessly. More particularly, certain embodiments relate to advertising map information for access outside of a data session or a voice session.

2. Background Art

Improvements in integrated circuit (IC) fabrication have allowed for smaller and/or more efficient wireless communication devices. As successive generations of wireless devices continue to scale, these devices generally trend toward an increased sensitivity to inefficiencies in utilization. Consequently, incremental improvements in resource use tend to result in increasingly important performance gains in wireless devices.

One common source of large and/or frequent resource consumption in wireless applications is mapping. Existing mapping techniques generally include a wireless device establishing a data session with some access point—e.g. a wireless router—to enable a data exchange between the wireless device and a mapping service (e.g. Google Maps™, Mapquest, etc.) which is accessed via the access point over the Internet or other such network. Typically, some web browser, navigation app or other such software executing on the wireless device downloads map information through a data channel which has been established between the wireless device and the mapping service.

Mobile devices often establish such a data session to access a mapping service in response to a user of the mobile device requesting to view a map. However, downloaded map information can also be stored locally in the mobile device for later use. In either case, existing mapping techniques can, at times, place a significant load at least on storage resources and/or network connectivity resources of the wireless device. Moreover, current techniques may be inadequate at times when a mapping service is, for any of a variety of reasons, unavailable for establishing a data channel via a network access point.

BRIEF DESCRIPTION OF THE DRAWINGS

The various embodiments of the present invention are illustrated by way of example, and not by way of limitation, in the figures of the accompanying drawings and in which:

FIG. 2 is a block diagram illustrating elements of a communication device to transmit map information according to an embodiment.

FIG. 3 is a block diagram illustrating elements of a communication device to receive map information according to an embodiment.

FIG. 4 is a flow diagram illustrating elements of a method for providing map information according to an embodiment.

FIG. 5 is a flow diagram illustrating elements of a method for receiving map information according to an embodiment.

DETAILED DESCRIPTION

Embodiments discussed herein variously provide for the advertising of map information in a wireless communication. As used herein with respect to communicating map information, "advertise," "advertised," "advertising" etc. variously refer to the characteristic of information being sent by a communication device independent of that communication device receiving any communication (e.g. any communication of at least some given type) requesting that such information be communicated.

For example, map information may be advertised by a first communication device—e.g. a wireless access point, a location beacon, a mobile device and/or the like—where that first communication device is not a response to any request which some second communication device may have sent in a data session or voice session to the first communication device. In an embodiment, such map information is sent in a control frame or a management frame—e.g. in a beacon frame—of a communication compliant with an Institute of Electrical and Electronics Engineers (IEEE) 802.11 specification.

Figure 1:
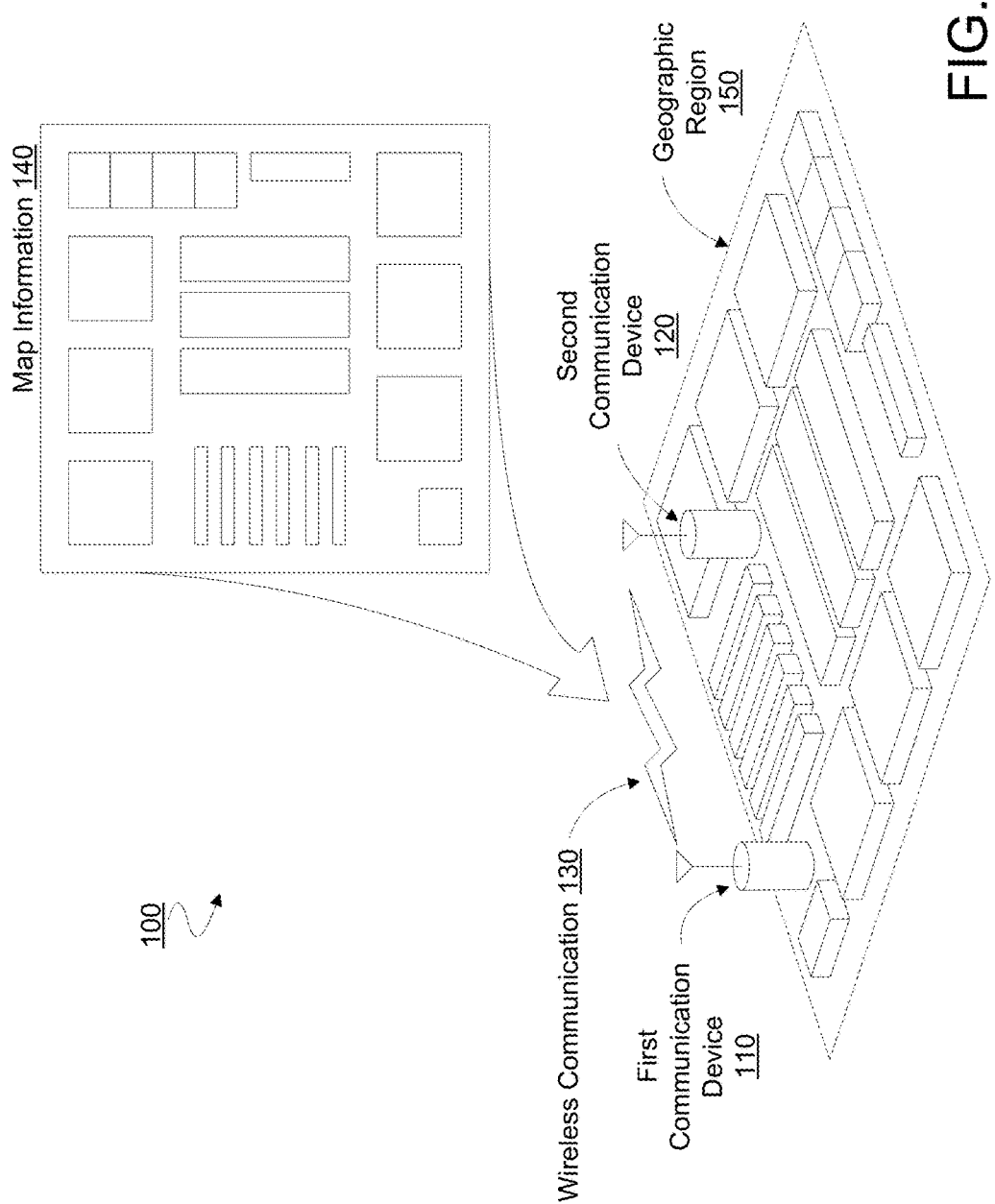
FIG. 1 is a block diagram illustrating elements of a system for communicating map information according to an embodiment.

FIG. 1 illustrates elements of a system 100 for communicating map information according to an embodiment. To illustrate elements of certain embodiments, system 100 is shown operating in a geographic region 150. However, geographic region 150 may not itself be part of system 100. Geographic region 150 may include one or more man-made structures. For example, geographic region 150 may include at least a portion of one or more floors of a commercial, residential, government or other type of building such as a store, office, mall, warehouse and/or the like. Alternatively or in addition, geographic region 150 may include any of a variety of combinations of natural features. In an embodiment, geographic region 150 includes at least a portion of multiple buildings. For example, geographic region 150 may include a neighborhood (e.g. comprising one or more city blocks), a campus, a residential development, an industrial park and/or the like. The size, geometry, location and/or other aspects of geographic region 150 are merely illustrative, and are not limiting on certain embodiments.

System 100 may include a first communication device 110 to send a wireless communication 130. First communication device 110 may, for example, include an access point—e.g. a wireless router, wireless modem, base station and/or the like—which is available to provide to any suitable wireless device operating in geographic region 150 access to some network (not shown). By way of illustration and not limitation, such a network may include one or more of a local area network (LAN)—e.g. a virtual LAN (VLAN) or wireless LAN (WLAN)—a wide area network (WAN), a cloud network, an Internet, a cellular network and/or the like. Alternatively or in addition, first communication device 110 may include any of a variety of wireless-capable computing devices including, but not limited to, a desktop computer, a laptop computer, a handheld device (e.g. a smart phone, tablet, notebook) and/or the like. Alternatively or in addition, first communication device 110 may include any of a variety of other types of wireless-capable electronic devices including, but not limited to a smart TV, a video gaming console, a set-top box and/or the like. In certain embodiments, first communication device 110 is a component of such a wireless-capable device, the component providing functionality for advertising map information as described herein.

In an embodiment, first communication device 110 includes logic to acquire a map describing geographic region 150. Such a map may be acquired by first communication device 110 using any of a variety of techniques. For example, first communication device 110 may be manually configured by a system administrator or other information technology (IT) personnel or user to store the map in a local storage (not shown). Alternatively or in addition, first communication device 110 may download the map from the Internet or other network for such local storage. The map may be acquired independent—e.g. prior to—another communication device of system 100 sending to first communication device 110 any request for the map.

In an embodiment, the acquiring of the map by first communication device 110 is automatic—e.g. based on first communication device 110 detecting an indication that it is operating, or is expected to operate, in geographic region 150. By way of illustration and not limitation, first communication device 110 may include or otherwise have access to one or more device location mechanisms—e.g. global positioning logic, proximity detection logic, trilateration/triangulation logic and/or the like—to detect an indication of a location of first communication device 110 and/or a location of a device which is in communication with first communication device 110. Such detecting may be according to any of a variety of conventional techniques, in certain embodiments. For example, first communication device 110 may identify a representation of device location in a geodetic system—e.g. with global positioning satellite (GPS) coordinates in terms of latitude and longitude—and/or with respect to relative proximity and/or arrangement with respect to one or more other devices. With such one or more device location mechanisms, first communication device 110 may identify geographic region 150 as being associated with its location and, in response, automatically request from some mapping service (Google Maps™, MapQuest or other such mapping service) a map for geographic region 150. The particular technique for first communication device 110 so detecting an indication of device location may not be limiting on certain embodiments.

Transmission of wireless communication 130 by first communication device 110 may be according to a wireless communication specification. By way of illustration and not limitation, wireless communication 130 may comply with an Institute of Electrical and Electronics Engineers (IEEE) 802.11 specification such as the IEEE 802.11, 1999 or later version—e.g. where wireless communication 130 is compatible with operation of a Wi-Fi™ device. Alternatively or in addition, wireless communication 130 may comply with one or more of a Bluetooth® standard of the Bluetooth Special Interest Group (SIG), Inc. (such as the Bluetooth Specification v1.1, 2002 or later version), and/or a WiGig specification of the Wireless Gigabit Alliance (such as the WiGig version 1.0 specification, 2009). Alternatively or in addition, wireless communication 130 may comply with one or more of the International Mobile Telecommunications-2000 (IMT-2000) specifications of the International Telecommunication Union (such as a 3G mobile communications standard), and/or one or more of the 4G mobile communications standards (such as the Mobile WiMAX standard of the WiMAX Forum and/or the LTE standard of 3GPP) and/or the like. Wireless communication 130 may comply with any of a variety of additional or alternative wireless communication specifications, according to various embodiments.

In an embodiment, wireless communication 130 includes map information 140 representing some or all of the map of geographic region 150. Some or all of map information 140 may, for example, be exchanged in a portion of wireless communication 130 which is outside of any data channel or voice channel, where such channel is for communication to or from communication device 110.

For example, wireless communication 130 may include a frame (or other such portion) which is of a frame type other than a data frame type of a wireless protocol. By way of illustration and not limitation, IEEE 802.11 specifications variously distinguish a data frame from one or more other types of frames such as a control frame and/or a management frame. Such other types of frames may support the establishing and/or maintaining of a data channel, but are to be distinguished from data frames which comprise communications of such a data channel. Some or all of map information 140 may be included in such a frame of wireless communication 130.

For example, wireless communication 130 may include a beacon frame or other such portion (referred to herein as a presence signal) which is to facilitate discovery of the presence of first communication device 110 by some other wireless device. In an embodiment, some or all of map information 140 is included in such a presence signal of wireless communication 130. Alternatively or in addition, some or all of map information 140 is included in another portion of wireless communication 130 which is outside of any data channel of first communication device 110.

Wireless communication 130 may be a broadcast signal, although certain embodiments are not limited in this regard. Alternatively or in addition, wireless communication 130 may be transmitted independent of first communication device 110 receiving any request for wireless communication 130—e.g. any request for map information 140.

System 100 may further include a second communication device 120 to receive wireless communication 130. In an embodiment, second communication device 120 includes some or all of the features discussed herein with respect to first communication device 110. For example, second communication device 120 may include one or more of an access point, smart phone or other mobile device and/or any of a variety of wireless-capable computing devices or other wireless-capable electronic devices. In certain embodiments, second communication device 120 is a component of such a wireless-capable device, the component providing functionality for receiving and processing advertised map information as described herein.

Second communication device 120 may include logic (not shown)—e.g. any of a variety of combinations of hardware, firmware and/or executing software—to detect wireless communication 130 and to identify map information 140 therein. By way of illustration and not limitation, second communication device 120 may include circuit logic to extract map information 140 from wireless communication 130 and to provide, based upon the extracted map information 140, a representation of the map of geographic region 150. Such a representation may, for example, be stored to a local storage (not shown) of second communication device 120. Alternatively or in addition, such a representation may be output to a display (not shown)—e.g. a touchscreen, monitor television screen and/or the like—which is included in or otherwise accessible to second communication device 120.

Based on map information 140, the map (or a portion thereof) represented with second communication device 120 may be generated to describe some or all features of geographic region 150. By way of illustration and not limitation, such a map may show the relative locations of one or more features of geographic region 150 with respect to one another. Such features may include one or more man-made features and/or one or more natural features. A map generated by second communication device 120 may, for example, show the relative positions of items and/or structures within a particular building—e.g. features on a particular floor of such a building. As shown in FIG. 1, the illustrative map information 140 describes a layout of elements—e.g. rooms, cubicles, tables, desks and/or the like—in at least part of a floor in an office in geographic region 150. Alternatively or in addition, such a map may show the relative positions of buildings and/or features between buildings with respect to one another. The map of geographic region 150 may, for example, identify the location of a feature—e.g. a printer, television, workstation, access point, beacon, telephone and/or the like—which is available to provide some functionality for a user of a communication device of system 100. For example, the map may include an icon or other graphical representation to identify the feature and/or to otherwise describe a functionality provided by that feature. Alternatively or in addition, such a map of geographic region 150 may identify one or more features which do not provide any particular functionality for a communication device and/or user.

FIG. 2 illustrates elements of a communication device 200 for providing map information in a wireless communication according to an embodiment. Communication device 200 may include some or all of the features of first communication device 110, for example.

In an embodiment, communication device 200 includes a storage 205 to store a map 210 which, for example, has been acquired according to one or more techniques discussed herein with reference to system 100. Map 210 may, for example, be stored in any of a variety of combinations of one or more storage media of communication device 200. By way of illustration and not limitation, storage 205 may include a random access memory (RAM) including one or more of a dynamic RAM (DRAM)—e.g. a flash memory solid state drive (SSD)—a static RAM (SRAM), a magnetic hard disk drive (HDD), read-writable optical media and any of a variety of other storage media types.

In an embodiment, communication device 200 includes logic to represent some or all of map 210 in a wireless communication—e.g. as information having some or all of the features of map information 140. By way of illustration and not limitation, communication device 200 may include frame generation logic 220 comprising any of a variety of combinations of hardware, firmware and/or executing software to include such map information in one or more frames of a wireless communication. Frame generation logic 220 may, for example include a processor, state machine, application specific integrated circuit (ASIC) such as a field programmable gate array (FPGA), or other such hardware to generate a frame to be included in a wireless communication.

In an embodiment, frame generation logic 220 includes a protocol engine to implement communications according to a wireless specification—e.g. according to IEEE 802.11, WiFi, Bluetooth, WiGig, 3G, 4G and/or the like. For example, frame generation logic 220 may include or otherwise have access to hardware for implementing certain wireless communications according to conventional techniques. Some or all of frame generation logic 220 may supplement such hardware to further provide for communication according to a map exchange protocol. For example, frame generation logic 220 may further exchange map information in a frame of a wireless communication—e.g. a frame which is not part of any data channel or voice channel which is for communication to or from communication device 200. For example, frame generation logic 220 may generate a control frame and/or a management frame according to IEEE 802.11, 1999 or similar protocol, where such frame includes map information representing some or all of map 210.

Frame generation logic 220 may include such map information in a beacon or other presence signal which is to facilitate discovery of communication device 200. Alternatively or in addition, such a frame may be for broadcast communication, although certain embodiments are not limited in this regard. In an embodiment, a frame which includes such map information may be generated by frame generation logic 220 independent of communication device 200 receiving any request for the map information—e.g. independent of any communication received in a data session or a voice session.

Communication device 200 may comprise a wireless interface 230—e.g. including a wireless network interface controller (WNIC) card, wireless transceiver and/or other suitable hardware—coupled to transmit a frame provided by frame generation logic 220, where the frame includes map information representing some or all of map 210. Wireless interface 230 may transmit such a frame via one or more antenna included in or otherwise accessible to communication device 200—e.g. via an illustrative antenna 240.

FIG. 3 illustrates elements of a communication device 300 for receiving map information in a wireless communication according to an embodiment. Communication device 300 may include some or all of the features of second communication device 120, for example. In an embodiment, communication device 300 is to receive map information from another device having some or all of the features of communication device 200.

For example, communication device 300 may include a wireless interface 310—e.g. a WNIC card, wireless transceiver and/or other suitable hardware—and one or more antennae, represented by an illustrative antenna 320, included in or coupled to communication device 300 to receive a wireless communication including map information representing some or all of a map of a geographic region. By way of illustration and not limitation, wireless interface 310 and antenna 320 may receive a wireless communication having some or all of the features of wireless communication 130.

In an embodiment, communication device 300 includes frame processor logic 330 comprising any of a variety of combinations of hardware, firmware and/or executing software to process a frame or other such portion of the received wireless communication. Frame processor logic 330 may, for example, include a processor, state machine, application specific integrated circuit (ASIC) such as a field programmable gate array (FPGA), or other such hardware to process a frame which is provided via wireless interface 310. In an embodiment, frame processor logic 330 includes a protocol engine to implement communications according to a wireless specification—e.g. according to IEEE 802.11, WiFi, Bluetooth, WiGig, 3G, 4G and/or the like. For example, frame processor logic 330 may include or otherwise have access to hardware for implementing wireless communications according to certain conventional techniques. Some or all of frame processor logic 330 may supplement such hardware to further provide for communication according to a map exchange protocol. For example, frame processor logic 330 may further process map information received in a frame of a wireless communication which is outside of any data channel or voice channel which is for communication to or from communication device 300. In an embodiment, frame processor logic 330 may process a control frame and/or a management frame according to IEEE 802.11, 1999 or similar protocol, where such frame includes map information representing some or all of map 210.

By way of illustration and not limitation, frame processor logic 330 may include or otherwise have access to map extraction logic 340 of communication device 300. In an embodiment, map extraction logic 340 includes hardware, firmware and/or executing software to detect—e.g. by type—map information which is included in a received frame of the wireless communication. Map extraction logic 340 may extract map information from one or more frames in response to detecting the presence of such map information.

In an embodiment, communication device 300 includes mapper logic 345 to receive map information extracted by map extraction logic 340. Mapper logic 345 may generate a representation of a map based on the map information provided by map extraction logic 340. In an embodiment, generating such a representation includes mapper logic 345 storing data, providing an output signal and/or the like—e.g. to provide for a graphical presentation of the map by some input/output (I/O) hardware (not shown) which is included in or otherwise accessible to communication device 300. Such I/O hardware may, for example, include one or more of a display, a touchscreen, a monitor and/or the like.

FIG. 4 illustrates elements of a method 400 for providing map information according to an embodiment. Method 400 may be performed at a communication device having some or all of the features of communication device 200, for example.

In an embodiment, method 400 includes, at 410, acquiring at the communication device a map describing a geographic region. Acquiring the map at 410 may, for example, include the communication device receiving a manual configuration to store map data in a storage media of the communication device. Alternatively or in addition, the acquiring at 410 may include the communication device downloading map data from a network to such storage media. In an embodiment, some or all of the map may be acquired independent of—e.g. prior to—another communication device sending to the communication device 110 any message in a data session or voice session to request the map.

Method 400 may further include, at 420, advertising map information to represent at least a portion of the map—e.g. wherein the advertising is independent of any request for the map information received in a data session or a voice session. Advertising the map information at 420 may, for example, include sending the map information in a wireless communication. By way of illustration and not limitation, map information may be sent in a frame (or other such portion) of a wireless communication, where the frame is of a frame type other than a data frame type—e.g. one of an IEEE 802.11 control frame type and/or a management frame type. In an embodiment, map information is advertised at 420 in a beacon frame or other presence signal which is to facilitate discovery of the communication device. Such map information may be advertised at 420 in a broadcast signal, although certain embodiments are not limited in this regard.

FIG. 5 illustrates elements of a method 500 for receiving map information according to an embodiment. Method 500 may be performed at a first communication device having some or all of the features of communication device 300, for example.

Method 500 may include, at 510, receiving at the first communication device a wireless communication from another communication device. The receiving wireless communication at 510 may conform with a wireless communication specification—e.g. one or more of an IEEE 802.11, WiFi, Bluetooth, WiGig, 3G, 4G or other wireless communication standard.

In an embodiment, method 500 further includes, at 520, identifying that the wireless communication includes advertised map information representing at least a portion of a map describing a geographic region. The map information may be advertised insofar as it is received in the wireless communication independent of any request for the map information being sent to the other communication device in a data session or a voice session. For example, the map information identified at 520 may be information such as that advertised at 420 of method 400.

In an embodiment, method 500 further includes, at 530, generating a representation of the map based on the map information. The generating at 530 may, for example, include storing data representing the map locally in the receiving device. Alternatively or in addition, the generating at 530 may include outputting one or more signals for a touchscreen, monitor, television screen and/or other display hardware to display the map.

Figure 6:
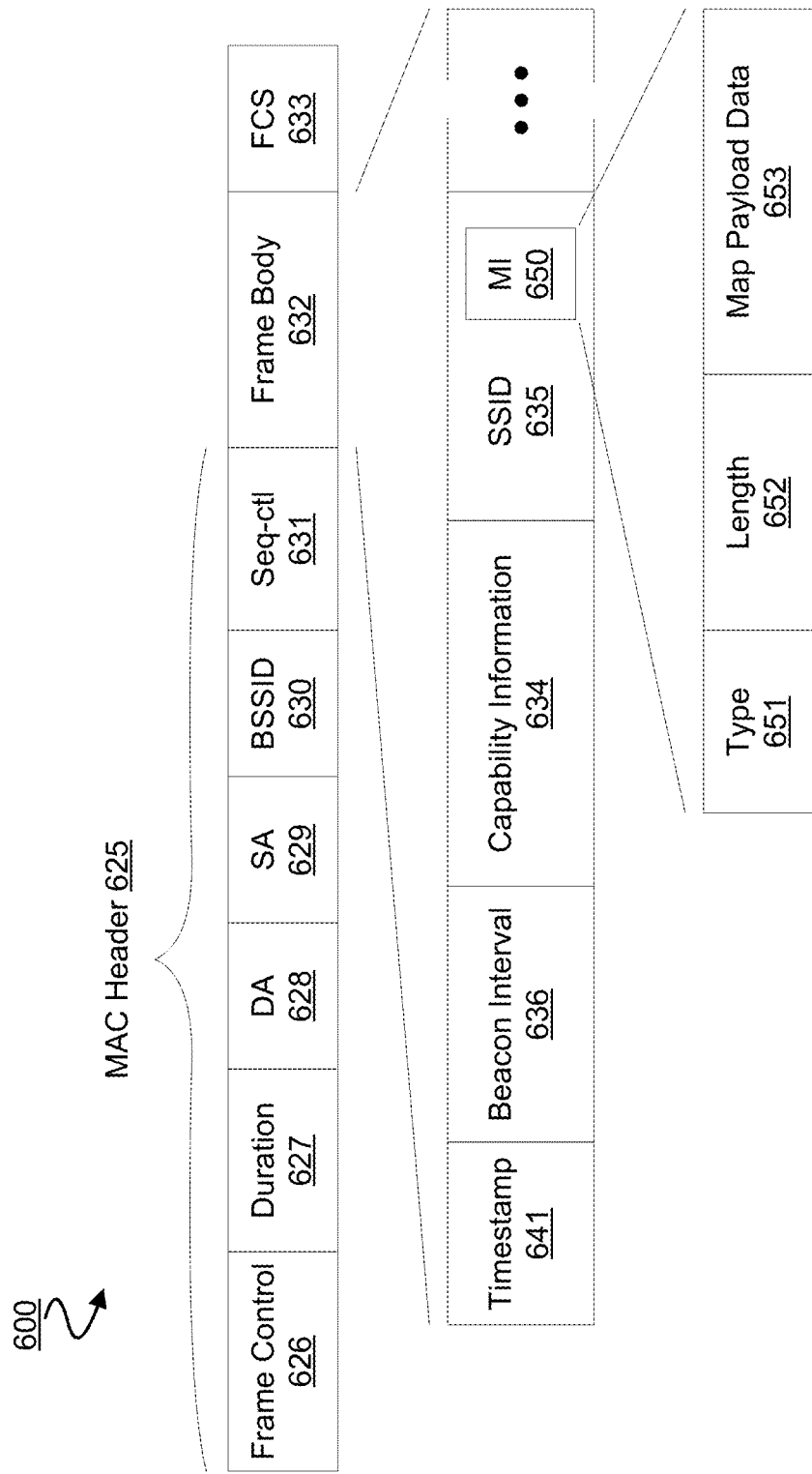
FIG. 6 is a block diagram illustrating elements of a format for a wireless communication including map information according to an embodiment.

FIG. 6 shows elements of a wireless communication 600 for exchanging map information according to an embodiment. To illustrate various features of certain embodiments, wireless communication 600 is shown having the format of a beacon frame according to any of various IEEE 802.11 specifications. However, wireless communication 600 may have any of a variety of additional or alternative formats, according to different embodiments.

Wireless communication 600 may have an 802.11 MAC header 625, which includes one or more of a Frame Control field 626, a duration/identification (ID) field 627, a Destination Address (DA) field 628, a Source Address field 629, a basic service set identification BSS ID field 630, and a Sequence Control (Seq-ctl) field 631. A Frame Body 632 may follow the MAC header 625 and a Frame Check Sequence (FCS) 633 may follow the Frame Body 632. The MAC header 625 may be the same for multiple frames for exchanging map information, where such frames may use their respective frame bodies to transmit different information specific to the management frame subtype.

In at least one embodiment of the present invention, a map exchange protocol—e.g. an extension to a standard wireless communication protocol—may be provided to variously facilitate map exchange techniques discussed herein. The map exchange protocol may be programmed into a communication device (e.g., within a network interface card, as part of an operating system, etc.) for use in supplementing or substituting part of a message for wireless transmission—e.g. an otherwise conventional part of said message—with map information. Alternatively or in addition, the map exchange protocol may be programmed into such a communication device for use in detecting the presence of map information in such a part of a wirelessly transmitted message.

In at least one approach, the protocol makes use of a Type-Length-Value (TLV) format for identifying the presence of map information in a frame component. By way of illustration and not limitation, a service set identifier (SSID) frame component 635 of Frame Body 632 may include map information (MI) 650 comprising a type field 651, a length field 652 and map payload data 653. Map information 650 may, for example, be in addition to other information communicated in SSID frame component 635 according to conventional techniques—e.g. per various IEEE 802.11 specifications. Frame Body 632 may further include one or more conventional IEEE 802.11 elements such as a timestamp 641, a beacon interval 636 and/or capability information 634, although certain embodiments are not limited in this regard.

In an embodiment, type (or tag) field 651 may include information identifying a type of map information 650—e.g. one or more values which, according to a map exchange protocol (or protocol extension), may be recognized by a receiver device as announcing the presence of map information 650. Length field 652 may describe for the receiver device a total length (e.g. in bytes) of the map payload data 653. Based on type field 651 and length field 652, a receiver device may identify map payload data 653 by type and, in response to such identifying, process map payload data 653 to facilitate generating of a map. The type field 651 and the length field 652 are typically fixed length fields. In the illustrated embodiment, for example, the type field 651 and the length field 652 are each 1 byte in length. The map payload data 653, on the other hand, may be any of a variety of lengths which the SSID field 635 is able to accommodate. The format and length of the map payload data 653 may be dictated by the type and length fields 651, 652.

Map information 650 may be included in any of a variety of other control frames or management frames which allow for a frame component to be substituted with, or supplemented with, map information. For example, a wireless communication specification may establish that some aspect of a particular frame component—e.g. a particular value, range of values and/or the like for such a frame component—is undefined, reserved or otherwise available for extending functionality of the specification. Certain embodiments may utilize one or more such available components to provide for communication of map information.

Figure 7:
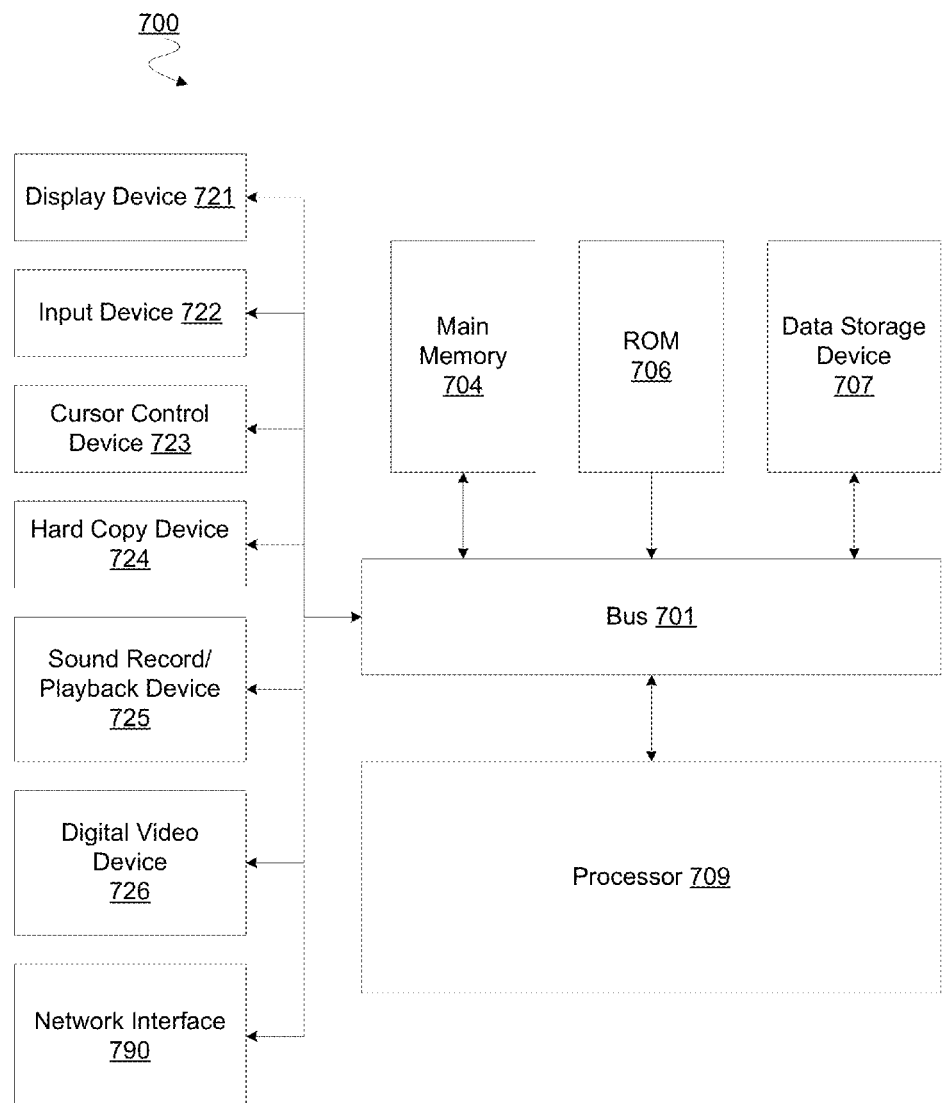
FIG. 7 is a block diagram illustrating elements of a device for communicating map information according to an embodiment.

FIG. 7 shows elements of an illustrative communication device 700 for providing map information according to one embodiment. Communication device 700 may include some or all of the features of communication device 200, for example. Alternatively or in addition, communication device 700 may include some or all of the features of communication device 300.

In an embodiment, communication device 700 includes a hardware platform of a wireless-capable device such as a desktop computer, laptop computer, a handheld computer—e.g. a tablet, palmtop, smart phone, media player, and/or the like—a gaming console, set-top box and/or other such computer system. Alternatively or in addition, computer device 700 may include a wireless router or other wireless-capable device to operate as a network access point for some other device. Alternatively, embodiments may be implemented in one or more embedded applications (e.g. in a data processing system of an automobile, mobile network base station, etc.) where, for example, an embedded processor or other such hardware may implement wireless communications according to a map exchange protocol.

In an embodiment, communication device 700 includes at least one interconnect, represented by an illustrative bus 701, for communicating information and a processor 709—e.g. a central processing unit—for processing such information. Processor 709 may include functionality of a complex instruction set computer (CISC) type architecture, a reduced instruction set computer (RISC) type architecture and/or any of a variety of processor architecture types. Processor 709 may couple with one or more other components of communication device 700 via bus 701. By way of illustration and not limitation, communication device 700 may include a random access memory (RAM) or other dynamic storage device, represented by an illustrative main memory 704 coupled to bus 701, to store information and/or instructions to be executed by processor 709. Main memory 704 also may be used for storing temporary variables or other intermediate information during execution of instructions by processor 709. Communication device 700 may additionally or alternatively include a read only memory (ROM) 706, and/or other static storage device—e.g. where ROM 706 is coupled to processor 709 via bus 701—to store static information and/or instructions for processor 709.

In an embodiment, communication device 700 additionally or alternatively includes a data storage device 707 (e.g., a magnetic disk, optical disk, and/or other machine readable media) coupled to processor 709—e.g. via bus 701. Data storage device 707 may, for example, include instructions or other information to be operated on and/or otherwise accessed by processor 709. In an embodiment, processor 709 may perform wireless communications to transmit map data stored in main memory 704, ROM 706, data storage device 707 or any other suitable data source.

Communication device 700 may additionally or alternatively include a display device 721 for displaying information to a computer user. Display device 721 may, for example, include a frame buffer, a specialized graphics rendering device, a cathode ray tube (CRT), a flat panel display and/or the like. Additionally or alternatively, communication device 700 may include an input device 722—e.g. a keyboard including alphanumeric and/or other keys to receive user input. Additionally or alternatively, communication device 700 may include a cursor control device 723, such as a mouse, a trackball, a pen, a touch screen, or cursor direction keys to communicate position, selection or other cursor information to processor 709, and/or to control cursor movement—e.g. on display device 721.

Communication device 700 may additionally or alternatively have a hard copy device 724 such as a printer to print instructions, data, or other information on a medium such as paper, film, or similar types of media. Additionally or alternatively, communication device 700 may include a sound record/playback device 725 such as a microphone or speaker to receive and/or output audio information. Communication device 700 may additionally or alternatively include a digital video device 726 such as a still or motion camera to digitize an image.

In an embodiment, communication device 700 includes or couples to a network interface 790 for connecting communication device 700 to one or more networks (not shown)—e.g. including a dedicated storage area network (SAN), a local area network (LAN), a wide area network (WAN), a virtual LAN (VLAN), an Internet and/or the like. By way of illustration and not limitation, network interface 790 may include one or more of a network interface card (NIC), an antenna such as a dipole antenna, or a wireless transceiver, although the scope of the present invention is not limited in this respect.

Processor 709 may support instructions similar to those in any of a variety of conventional instruction sets—e.g. an instruction set which is compatible with the x86 instruction set used by existing processors. By way of illustration and not limitation, processor 709 may support operations having some or all of the features of operations supported in the IA™ Intel Architecture, as defined by Intel Corporation of Santa Clara, Calif. (see "IA-32 Intel® Architecture Software Developers Manual Volume 2: Instruction Set Reference," Order Number 245471, available from Intel of Santa Clara, Calif. on the world wide web at developer.intel.com). As a result, processor 709 may support one or more operations corresponding, for example, to existing x86 operations, in addition to the operations of certain embodiments.

In one aspect, a communication device comprises a wireless interface to receive a wireless communication from another communication device and map extraction logic to identify that the wireless communication includes map information advertised by the other communication device. The map information represents at least a portion of a map describing a geographic region. The map information is provided to the communication device independent of any request for the map information being sent from the communication device to the other communication device in a data session or a voice session. The communication device further includes mapper logic coupled to the map extraction logic. The mapper logic is to generate a representation of the map based on the map information.

In an embodiment, the wireless communication is a broadcast communication. In an embodiment, the wireless communication includes a beacon message for discovery of the other communication device. In an embodiment, the map information is sent in one of a management frame and a control frame of the wireless communication. In an embodiment, the map information describes respective functionality of one or more devices included in the geographic region.

In an embodiment, the wireless interface is to receive a second wireless communication from the other communication device, wherein the map extraction logic is further to identify that the second wireless communication includes second map information advertised by the other communication device. The second map information represents a second portion of the map. The mapper logic is to generate the representation of the map further based on the second map information.

In another aspect, a method is performed at a first communication device according to an embodiment, the method comprising receiving a wireless communication from a second communication device, and identifying that the wireless communication includes map information advertised by the second communication device. The map information represents at least a portion of a map describing a geographic region. The map information is provided to the first communication device independent of any request for the map information being sent from the first communication device to the second communication device in a data session or a voice session. The method further includes generating a representation of the map based on the map information.

In an embodiment, the wireless communication is a broadcast communication. In an embodiment, the wireless communication includes a beacon message for discovery of the other communication device. In an embodiment, the map information is sent in one of a management frame and a control frame of the wireless communication. In an embodiment, the map information describes respective functionality of one or more devices included in the geographic region. In an embodiment, the method further comprises periodically advertising of the map information.

In an embodiment, the method further comprises receiving a second wireless communication from the other communication device, and identifying that the second wireless communication includes second map information advertised by the other communication device, the second map information representing a second portion of the map, wherein the generating the representation of the map is further based on the second map information.

In another aspect, a computer-readable storage medium has stored thereon instructions which, when executed by a first communication device, cause the first communication device to perform a method comprising receiving a wireless communication from a second communication device, and identifying that the wireless communication includes map information advertised by the second communication device. The map information represents at least a portion of a map describing a geographic region. The map information is provided to the first communication device independent of any request for the map information being sent from the first communication device to the second communication device in a data session or a voice session. The method further includes generating a representation of the map based on the map information.

In an embodiment, the wireless communication is a broadcast communication. In an embodiment, the wireless communication includes a beacon message for discovery of the other communication device. In an embodiment, the map information is sent in one of a management frame and a control frame of the wireless communication. In an embodiment, the map information describes respective functionality of one or more devices included in the geographic region. In an embodiment, the method further comprises periodically advertising of the map information.

In an embodiment, the method further comprises receiving a second wireless communication from the other communication device, and identifying that the second wireless communication includes second map information advertised by the other communication device, the second map information representing a second portion of the map, wherein the generating the representation of the map is further based on the second map information.

In another aspect, a communication device comprises a storage to acquire a map describing a geographic region, frame generation logic coupled to the storage, the frame generation logic to advertise map information to represent at least a portion of the map. The frame generation logic is to send the map information from the communication device in a wireless communication, wherein the frame generation logic is to advertise the map information independent of any request for the map information received by the communication device in a data session or a voice session.

In an embodiment, the wireless communication is a broadcast communication. In an embodiment, the frame generation logic is to send a beacon message for discovery of the communication device, wherein the frame generation logic to advertise the map information comprises the frame generation logic to include the map information in the beacon message. In an embodiment, the storage is to acquire the map independent of any request for the map information received by the communication device in a data session or a voice session. In an embodiment, the map information is sent in one of a management frame and a control frame of the wireless communication.

In an embodiment, the map information describes respective functionality of one or more devices included in the geographic region. In an embodiment, the frame generation logic is to periodically advertise the map information. In an embodiment, the frame generation logic is to advertise the map information to represent a first portion of the map, wherein the frame generation logic is further to advertise second map information to represent a second portion of the map, including the frame generation logic to send the second map information from the communication device in a second wireless communication.

Techniques and architectures for communicating map information are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of functions and symbolic representations of operations on data bits within a computer memory. These functions and representations are the means used by those skilled in the computing arts to most effectively convey the substance of their work to others skilled in the art. A method is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The methods and displays presented herein are not inherently related to any particular computer or other apparatus. Various general purpose systems may be used with programs in accordance with the teachings herein, or it may prove convenient to construct more specialized apparatus to perform the required method operations. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A communication device comprising: a wireless interface to receive wireless communication from a second communication device, wherein the wireless communication includes a data packet; and map extraction logic including circuitry configured to identify that one of a management frame of the data packet and a control frame of the data packet includes map information advertised by the second communication device, the map information representing at least a portion of a map describing at least man-made structures and natural features with respect to each other within a geographic region, wherein the map information further describes respective functionality of multiple devices included in the geographic region, wherein the map information is provided to the communication device independent of any request for the map information being sent form the communication device to the second communication device in a data session or a voice session, wherein the one of the management frame and the control frame is compatible with a packet format of a communication protocol which distinguishes a data frame type of the packet format from a management frame type of the packet format or from a control frame type of the packet format; and mapper logic coupled to the map extraction logic, the mapper logic including circuitry configured to generate a representation of the map based on the map information.

2. The communication device of claim 1, wherein the wireless communication is a broadcast communication.

3. The communication device of claim 1, wherein the wireless communication includes a beacon message for discovery of the second communication device.

4. The communication device of claim 1, wherein the wireless interface further to receive a second wireless communication from the second communication device, wherein the map extraction logic further to identify that the second wireless communication includes second map information advertised by the second communication device, the second map information representing a second portion of the map, and wherein the mapper logic to generate the representation of the map further based on the second map information.

5. A method at a first communication device, the method comprising:
receiving a wireless communication from a second communication device, wherein the wireless communication includes a data packet;
identifying that one of a management frame of the data packet and a control frame of the data packet includes map information advertised by the second communication device, the map information representing at least a portion of a map describing at least man-made structures and natural features with respect to each other within a geographic region, wherein the map information further describes respective functionality of multiple devices included in the geographic region, wherein the map information is provided to the first communication device independent of any request for the map information being sent from the first communication device to the second communication device in a data session or a voice session, wherein the one of the management frame and the control frame is compatible with a packet format of a communication protocol which distinguishes a data frame type of the packet format from a management frame type of the packet format or from a control frame type of the packet format; and
generating a representation of the map based on the map information.

6. The method of claim 5, wherein the wireless communication is a broadcast communication.

7. The method of claim 5, wherein the wireless communication includes a beacon message for discovery of the second communication device.

8. The method of claim 5, the method further comprising periodically advertising the map information.

9. The method of claim 5, further comprising:
receiving a second wireless communication from the second communication device;
identifying that the second wireless communication includes second map information advertised by the second communication device, the second map information representing a second portion of the map; and
wherein the generating the representation of the map is further based on the second map information.

10. A non-transitory computer-readable storage medium having stored thereon instructions, which, when executed by a first communication device, cause the first communication device to perform a method comprising:
receiving a wireless communication from a second communication device, wherein the wireless communication includes a data packet;
identifying that one of a management frame of the data packet and a control frame of the data packet includes map information advertised by the second communication device, the map information representing at least a portion of a map describing at least man-made structures and natural features with respect to each other within a geographic region, wherein the map information further describes respective functionality of multiple devices included in the geographic region, wherein the map information is provided to the first communication device independent of any request for the map information being sent from the first communication device to the second communication device in a data session or a voice session, wherein the one of the management frame and the control frame is compatible with a packet format of a communication protocol which distinguishes a data frame type of the packet format from a management frame type of the packet format or from a control frame type of the packet format; and
generating a representation of the map based on the map information.

11. The non-transitory computer-readable storage medium of claim 10, wherein the wireless communication is a broadcast communication.

12. The non-transitory computer-readable storage medium of claim 10, wherein the wireless communication includes a beacon message for discovery of the second communication device.

13. The non-transitory computer-readable storage medium of claim 10, the method further comprising periodically advertising of the map information.

14. The non-transitory computer-readable storage medium of claim 10, the method further comprising:
receiving a second wireless communication from the second communication device;
identifying that the second wireless communication includes second map information advertised by the second communication device, the second map information representing a second portion of the map; and
wherein the generating the representation of the map is further based on the second map information.

15. A communication device comprising:
a storage to acquire a map describing at least man-made structures and natural features with respect to each other within a geographic region; and
frame generation logic including circuitry coupled to the storage, the frame generation logic to advertise map information to represent at least a portion of the map, including the frame generation logic to send from the communication device a wireless communication including a data packet, wherein one of a management frame of the data packet and a control frame of the data packet includes the map information, wherein the map information representing at least a portion of the map describing the at least man-made structures and natural features with respect to each other within the geographic region, wherein the map information further describes respective functionality of multiple devices included in the geographic region, wherein the frame generation logic to advertise the map information independent of any request for the map information received by the communication device in a data session or a voice session, wherein one of the management frame and the control frame is compatible with a packet format of a communication protocol which distinguishes a data frame type of the packet format from a management frame type of the packet format or from a control frame type of the packet format;
wherein a representation of the map is generated based on the map information.

16. The communication device of claim 15, wherein the wireless communication is a broadcast communication.

17. The communication device of claim 15, wherein the frame generation logic to send a beacon message for discovery of the communication device, and wherein the frame generation logic to advertise the map information comprises the frame generation logic to include the map information in the beacon message.

18. The communication device of claim 15, wherein the storage to acquire the map is independent of any request for the map information received by the communication device in a data session or a voice session.

19. The communication device of claim 15, wherein the frame generation logic to periodically advertise the map information.

20. The communication device of claim 15, wherein the frame generation logic to advertise the map information to represent a first portion of the map, and wherein the frame generation logic further to advertise second map information to represent a second portion of the map, including the frame generation logic to send the second map information form the communication device in a second wireless communication.

* * * * *